United States Patent [19]

Küsters

[11] 4,154,160
[45] May 15, 1979

[54] PRESSURE CONTROL DEVICE FOR A PROCESSING MACHINE WITH ROLLS

[75] Inventor: Karl-Heinz Küsters, Krefeld-Forstwald, Fed. Rep. of Germany

[73] Assignee: Edward Küsters, Krefeld, Fed. Rep. of Germany

[21] Appl. No.: 800,395

[22] Filed: May 25, 1977

[30] Foreign Application Priority Data

May 26, 1976 [DE] Fed. Rep. of Germany ....... 2623492

[51] Int. Cl.² ......................... B30B 15/14; B30B 3/04
[52] U.S. Cl. ................................. 100/47; 100/162 B; 100/170; 29/113 AD; 29/116 AD; 137/85
[58] Field of Search ............... 100/35, 47, 162, 162 B, 100/170, 176; 72/20, 245; 29/113 R, 113 AD, 116 R, 116 AD; 137/85, 86

[56] References Cited

U.S. PATENT DOCUMENTS

| 2,908,964 | 10/1959 | Appenzeller | 29/116 AD |
| 3,023,695 | 3/1962 | Küster | 100/170 |
| 3,119,324 | 1/1964 | Justus | 29/116 AD |
| 3,885,465 | 5/1975 | Bergendahl | 100/47 |
| 4,023,480 | 5/1977 | Biondetti | 100/47 |

FOREIGN PATENT DOCUMENTS

1460632 10/1973 Fed. Rep. of Germany ............. 15/170

Primary Examiner—Peter Feldman
Attorney, Agent, or Firm—Kenyon & Kenyon, Reilly, Carr & Chapin

[57] ABSTRACT

A pressure control device for processing machines having at least one roll which has a stationary core around which a hollow roll which forms the roll proper revolves with radial spacing from the core, the hollow roll supported at its ends on the core and supported on the core in between in the radial direction by a fluid pressure medium disposed in a chamber formed at the core, the fluid pressure medium generating a force acting on the inside of the hollow roll to provide the operating pressure of the roll, with a loading device operated by a fluid pressure medium also applied either to the roll or a counter-roll, either the loading device or roll forming a controlling element, with a control pressure which is derived from the pressure prevailing therein used to adjust a pressure in the other controlled element which has a definite predetermined pressure ratio to the pressure in the controlling element, which pressure control device includes a pressure ratio monitoring device having as inputs the control pressure and the actual pressure in the controlled element and compares the inputs and, if the pressure in the controlling element becomes to high relative to a predetermined pressure ratio, reduces the pressure to the controlled element in order to reestablish the desired predetermined pressure ratio.

8 Claims, 4 Drawing Figures

PRESSURE CONTROL DEVICE FOR A PROCESSING MACHINE WITH ROLLS

BACKGROUND OF THE INVENTION

This invention relates to processing machines with rolls in general and more particularly to an improved pressure control device for processing machines having at least one roll which has a stationary core, around which a hollow roll revolves which forms the roll proper, radially spaced from the core, and supported directly on the core at its ends and supported in the radial direction in between the ends through a fluid pressure medium which is disposed in a chamber formed at the core.

In such a device the pressure medium generates a force acting on the inside of the hollow roll and, thereby, controls the operating pressure of the roll. Such processing machines typically have a loading device which is operated by a fluid pressure medium and applies a force at the roll or a counter roll. In this way the loading device or the roll form the controlling element and there is derived from the pressure prevailing therein a control pressure, by means of which, in the respective other controlled element a pressure can be adjusted which is in a definite, predetermined pressure ratio to the pressure in the controllable element. The invention is applicable particularly to processing machines, in which the loading device is the controlling element.

From U.S. Pat. No. 2,908,964, an embodiment of such a pressure control device for a pair of rolls is known. In the disclosed device the rolls are designed as so-called "swimming rolls". In such rolls, a seal extends along the core between the latter and the inside of the hollow roll. This seal together with transversal seals provided at the ends of the hollow roll, subdivides the space between the core and the hollow roll into two lengthwise chambers which are filled with hydraulic oil which constitutes the fluid pressure medium. The lengthwise chamber situated on the side of the roll gap receives the higher pressure. The pressure difference determines the working pressure, i.e., the line pressure in the roll gap. The hydraulic oil acts directly against the inside of the hollow roll.

The present invention, however, is also applicable to other types of rolls in which pressure is transmitted to the inside of a hollow roll by mechanical intermediate members such as pressure shoes or roller arrangements. Such rolls are described, for instance, in U.S. Pat. No. 2,395,915, German Offenlegungsschrift No. 2 230 139 and German Auslegeschriften Nos. 1 193 792 and 1 561 706.

In the device described in U.S. Pat. No. 2,908,964, one of the so-called "swimming rolls" is fixedly supported, while a loading device which comprises two hydraulic piston/cylinder units, which transmits their force to the ends of the core of the counter roll, acts, in the case of the other roll, on the ends of the core which form the journals of the roll and protrude from the hollow roll.

The important point is that the pressures in the floating rolls and in the loading device are very accurately matched to each other. If, for instance, the pressure in a floating roll is too high, i.e., higher than the counter forces require, then the floating roll will be bent, since its hollow roll is supported on the core at the ends and the excessive pressure in the center strives to push the hollow roll away from the core toward the counter roll or, in any event, will cause a non-uniform line pressure in the roll gap. All this is true not only for the so-called "swimming roll" but also for the other types of rolls known from the above-mentioned references.

It is a further disadvantage, if the pressure in the rolls is not accurately matched to the situation, that the bearings at the ends of the hollow roll are then subject to an excessively high load. In the ideal case, i.e., if the pressure in the roll is accurately matched, the counterforce should be in equilibrium with the force exerted by the fluid pressure medium and the bearings at the end will have only a guiding function. But if the pressures do not balance, then the bearings must take up the pressure difference, which leads to an unbalanced force between the hollow roll and the core. The same is true if the force of the loading device does not exactly correspond to the pressure in the roll. If, for instance, a very low pressure in the roll occurs at the same time as a very high pressure at the loading device, the forces exerted thereby are fully conducted onto the bearings in the roll.

For monitoring the pressure ratio in the roll and in the loading device, a pressure ratio control is provided in the embodiment described in U.S. Pat. No. 2,908,964. This pressure ratio control regulates the pressure at the loading device so that the force exerted by a web of material passing between the rolls is just cancelled by that pressure due to the hydraulic oil in the lengthwise chamber of the "swimming roll". Then, all pressure is transmitted by the hydraulic oil, while the bearings at the ends of the hollow roll remain free of the forces acting in the roll gap. In the embodiment described in U.S. Pat. No. 2,908,964, the controlling variable is the pressure in the "swimming roll".

However, it is also well known in the art to provide the control in such a processing machine in the inverse manner, i.e., to choose the pressure in the loading device as the controlling variable and to set the pressure in the roll accordingly.

It is a condition for the functioning of such a pressure control device that the pressure in the controlled element can actually reach the pressure which the controlling element demands. However, this is not always the case in practice; rather, the pressure in the controlled element sometimes cannot follow the controlling variable fast enough or cannot follow it at all, be it because of a lack or excessive sluggishness of the pressure supply or because of pressure losses occurring at certain points.

In a processing machine with rolls of the type in question, in which the pressure in the loading device is the control input, this can occur in two cases in particular. First, it occurs if the loading pressure rises faster than the pressure in the roll can follow. Such an increase of the loading pressure is necessary if, after inserting a web into the processing machine, the line pressure must be increased to the full operating pressure. Secondly, the desired pressure ratio is not obtained if the pressure in the roll does not ever come up to its normal magnitude for whatever reason. This may be due to an insufficient capacity of the pump system, continuous leakage losses because of a faulty condition of the seals in the roll, defective connections in the control lines, etc.

Similar problems can occur if the pressure in the roll is the controlling input.

SUMMARY OF THE INVENTION

It is the object of the present invention to develop a pressure control device of the type mentioned at the outset in such a manner that deviations of the pressures in the loading device or in the roll resulting in a deviation from the desired pressure ratio are prevented.

As a solution to this problem, the invention provides a pressure ratio monitoring device which compares the control pressure with the actual pressure in the controlled element (roll or loading device) and, if the pressure in the controlling element is too high in relation to the predetermined pressure ratio, decreases the former to this pressure ratio.

The control pressure is a pressure which is derived from the pressure on the controlling element. This control pressure calls for a pressure of definite magnitude in the controlled element. The pressure ratio monitoring device now monitors whether the actual pressure in the controlled element meets this requirement. Should this not be the case, a change is not made on the side of the controlling element in the form of an even greater increase of the control pressure, but the control is, so to speak, conducted in reverse and now, the pressure in the controlled element is reduced until the predetermined pressure ratio prevails again.

While through this measure, the working pressure may possibly not be able to be increased above a defined value, it is ensured that at least at the attainable pressure the correct relationship between the pressures in the roll and in the loading device prevails and the processing machine operates at a pressure equilibrium approaching the ideal condition, where excessive loading of the bearings and, in particular, non-uniform line pressure do not come about.

Arrangements are known in which a separate and, in particular, pneumatic system is provided for controlling the pressure ratio, which generates, among other things, in particular, a pneumatic control signal for adjusting the pressure in the controlling element. German Pat. No. 1 523 351 shows a roll arrangement with "swimming rolls" and a hydraulically operated loading device, in which a pneumatic control system is provided.

In such a pressure control device, the pressure ratio monitoring device can comprise, according to one embodiment of the present invention, a control element which is acted upon by pressures representative of the pressures in the roll or in the loading device and which lets the control signal pass through unchanged as long as the ratio between the controlling pressure and the controlled pressure is equal to or below a predetermined value, but throttles the control signal down as soon as the ratio exceeds the value.

The point of intervention of the pressure monitoring device is therefore in the separate system for setting or controlling the pressures in the roll and in the loading device. As long as the pressure ratio corresponds to the desired value, nothing happens. As soon, however, as the pressure to be controlled does not follow, an intervention is made in that the control signal in the separate system and, correspondingly, also the pressure in the controlling element are reduced.

In detail, the design may be such that the control element comprises a diaphragm arrangement which actuates a throttling valve arranged in the line carrying the control signal for the controlling element and to which the control pressure is applied on the one side, a force formed from the actual pressure in the controlled element on the other side.

In normal operation, an equilibrium results from this actual pressure and the control pressure. In the case of a deviation, the diaphragm is displaced and the throttling valve is actuated in the desired manner.

In an arrangement, in which two oppositely disposed chambers which contain hydraulic pressure fluid of different pressures are provided at the core of the roll and in which the differences of these pressures determines the working pressure of the roll, as is the case, for instance, with a so-called "swimming roll", it is advisable to provide an arrangement known per se having two coaxially opposite bellows which are acted upon by the pressures in the chambers and which act, on the sides facing each other, on a lever, and are firmly supported on the other sides which face away from each other, and to provide mechanical transmission members for transmitting displacement of the lever to the diaphragm of the control element.

In this manner, a pressure representative of the working pressure in the roll is brought to bear and can be compared with the control pressure.

Such an element with two oppositely disposed bellows is described in German Pat. No. 1 460 632.

Roll arrangements are known, in which the selectable setting of the hydraulic pressure for the controlling elements takes place using pneumatically controlled regulators for the hydraulic pressure. These set a hydraulic pressure dependent on the pneumatic control signal and an adjusting valve in the feed line carrying the pneumatic control signal supplies an adjustable portion of a fixed pneumatic pressure as a control signal.

In such an arrangement, it is advisable to arrange the pressure monitoring device in the line which carries the fixed pneumatic pump pressure to the adjusting valves.

Then, when the pressure monitoring device has become operative, instead of the full pneumatic pump pressure, the adjusting valves receive only a reduced pressure, from which the adjusting valves then also form an accordingly reduced control signal for the controlling element.

The pressure ratio monitoring device compares the control pressure for the controlled element, developed in a separate system, with the actually prevailing pressure. If, however, the system generating the control pressure itself fails for any reason, the pressure in the controlled element could drop without the pressure ratio monitoring device going into action, just because the control pressure is also not "raised" in such a case. In spite of this, the pressure in the controlling element could be too high.

In order to also provide for such a failure of a separate pneumatic control system, a further embodiment of the present invention consists of arranging a pneumatic control element in the line carrying the fixed pneumatic pump pressure to the adjusting valves, ahead of the pressure ratio monitoring device. A pneumatic pressure representing the pressure in the controlling element and the fixed pneumatic pump pressure are applied to the pneumatic control element. If the first-mentioned pressure increases, the control element only lets a correspondingly rising portion of the fixed pneumatic pressure pass.

The control signal for setting the pressure in the controlling element can therefore rise only if a previous rise has been "reported back" by the pneumatic system. Thus, the pressure in the controlling element also can only rise under these conditions. In the event of a failure of the pneumatic system, such "reporting back" naturally is omitted and no pressure rise can occur. The pressure then remains at a lower base value which is set at the hydraulic-pneumatic control element.

Finally, a pressure limiter can also be arranged in the line for the control pressure to the controlled element. Thereby, the pressure in the controlled element can never increase beyond a permissable amount. This is particularly important if the controlling element is designed as a double acting pressure cylinder, where part of the weight of the roll resting thereon is relieved by a pressure on the side of the piston opposite to the direction of the loading, this relief pressure likewise being used for controlling the controlled element in the sense that the pressure in the controlled element becomes lower with increasing relief pressure. If now the relief pressure drops out for any reason, the loading in the roll gap thereby increases and the control increases the pressure in the controlled element accordingly. Thus, there is the danger that the permissable load of the rolls will be exceeded. The pressure limiter in the line of the control pressure to the controlled element not prevents a further increase of the pressure in the controlled element. This renders the pressure ratio monitoring device operative and accordingly reduces the pressure in the controlling element.

DETAILED DESCRIPTION OF THE INVENTION

Figure 1:
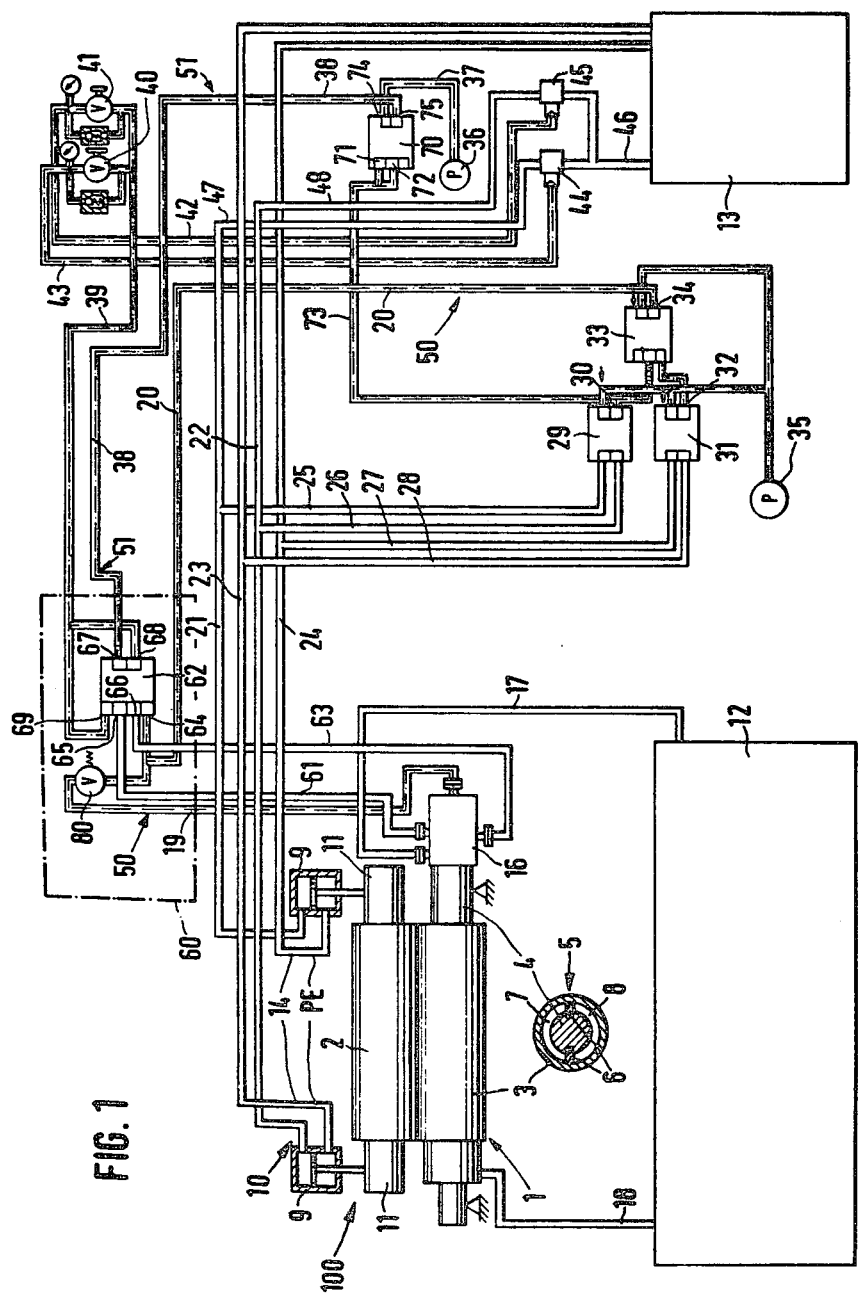
FIG. 1 is a pneumatic-hydraulic circuit diagram of a roll arrangement in which the present invention is realized.

In the drawings, hydraulic lines are shown as solid lines and pneumatic lines as broken lines.

In FIG. 1, a processing machine 100, with a floating roll 1, e.g., a "swimming roll", and any counter roll 2, is shown. The floating roll comprises a hollow roll 3, which is supported at its ends on a core 4. The core 4 goes through the hollow roll 3 lengthwise and its ends protrude from the hollow roll 3, the ends forming the roll journals. As is evident from the small cross section of the floating roll, designated as a whole with 5, the core leaves a certain spacing from the inside of the hollow roll 3. The space in between is subdivided into two longitudinal chambers 7 and 8 which are arranged opposite to each other in the direction of the roll pressure, by two longitudinal seals 6 arranged at the core. At the ends of the longitudinal chambers 7 and 8, transversal seals are provided inside of the bearings, so that the longitudinal chambers are substantially closed and a hydraulic pressure can be built up in them. In the longitudinal chamber 7 facing the roll gap, a higher pressure is generated, which results in taking up the load in the roll gap. In revolving, the hollow roll 3 slides past the seals 6 and is supported between the bearings only via the hydraulic pressure fluid in the longitudinal chamber 7.

While the floating roll 1 in the illustrated embodiment is supported firmly, the counter roll 2 has a loading device 10 which comprises two hydraulic piston/cylinder units 9, which exert pressure directed against the floating roll 1 on the roll journals 11 of the counter roll 2.

The hydraulic pressure medium for the pressure supply of the floating roll 1 is furnished by the pressure supply unit 12, which contains essentially a pump generating a constant pressure.

The pressure for the hydraulic piston/cylinder units 9 is supplied by the pressure supply unit 13. Unit 13 makes a constant hydraulic pressure available from which the controlled pressure for actuating the hydraulic piston/cylinder units 9 in pressing the counter roll 2 against the floating roll 1 is produced in a manner yet to be explained. A certain amount of hydraulic pressure PE is also present on the piston rod side of the piston/cylinder units 9 and is conducted there via the lines 14. The working pressure therefore is the difference between the pressures prevailing on the two sides on the piston/cylinder units 9. If the roll arrangement is to be raised, i.e., the counter roll 2 is to be lifted from the floating roll 1, then the pressure brought to the piston rod side is raised beyond the pressure prevailing on the closed side.

The pressure in the floating roll is controlled by a difference pressure control 16 which maintains a certain portion of the full pressure, brought out via the line 17 from the pressure supply unit 12, in the longitudinal chamber 7. There is also a hydraulic pressure in the longitudinal chamber 8, which is brought about, among other factors, by the hydraulic pressure medium leaking through at the seals 6. The pressure medium escaping into the longitudinal chamber is led off continuously into the sump via line 18, so that no excessive pressure can build up, or so that the pressure remains at the regulated value.

The control of the portion of the full pressure of the pressure supply unit 12 prevailing in the line 17 maintained in the longitudinal chamber 7 takes place through a separate pneumatic system. The pneumatic control pressure 50 is brought in via the lines 19 and 20. The pressure in the longitudinal chamber is set depending on how high this control pressure 50 is.

The pressure in the loading device 10 are the control input for determining the control pressure 50. The lines 21 and 22 leading to the closed sides of the piston/cylinder units 9 as well as the lines 23 and 24 leading to the piston rod sides are tapped via branch lines 25 and 26 and 27 and 28, respectively. The pressures from the closed sides go to a converter 29, which generates a pneumatic signal corresponding to the average of the two pressures at its output. Similarly, the pressures of the piston rod sides are conducted to a hydraulic-pneumatic converter 31, which produces a pneumatic signal representing the average value at its output 32.

Since the force actually exerted by the loading device depends on the difference of these pressures, the signals at the outputs 30 and 32 are fed to a pneumatic summing member 33 which compares the signals with each other and forms therefrom the pneumatic control pressure 50, which appears at the output 34 and is fed via the lines 20 and 19 to the difference pressure control 16, and thus controls the pressure in the floating roll 1. The pneumatic pressure for the devices 29, 31 and 33 is made available by the air supply unit 35 and fed to the inputs of the devices 29, 31 and 33 designated with the small arrows.

The pressure in the piston/cylinder units 9 forming the loading device 10 must be adjustable independently.

This pressure adjustment again takes place by means of a separate pneumatic system. A pump 36 generates a constant pneumatic pressure, which is fed via the lines 37,38 and 39 to two adjusting valves 40 and 41 which can be operated from the outside and, which feed, depending on how they are actuated, a certain portion of the pneumatic pressure supplied to two pneumatic-hydraulic converters 44 and 45 via the lines 42 and 43. The converters 44 and 45 receive constant hydraulic pressure from the pressure supply unit 13 via the line 46. Depending on the magnitude of the pneumatic pressure in the lines 42 and 43, a certain portion of the full pressure in the line 46 is now passed on to the lines 47 and 48 which open into the lines 21 and 22, respectively, and furnish the pressure fluid for the closed side of the piston/cylinder units 9. The pressure of the loading device 10 is therefore determined by setting the adjusting valves 40 and 41.

The pressure in the loading device 10 again determines, in the manner already described, the control pressure 50 prevailing in the lines 20 and 19, which controls the pressure in the floating roll 1 in such a manner that it is in a definite ratio to the pressure in the loading device 10.

It may now occur that the pressure in the floating roll 1 does not reach the value which is called for by the control pressure 50. If for instance, the seals 6 pass too much pressure fluid, sufficient pressure cannot build up in the longitudinal chamber 7. Defects in the hydraulic feed line to the floating roll 1 also may prevent sufficient pressure build up. As a result, the force exerted by the loading device 10 is too large in relation to the counterforce of the hydraulic pressure medium in the longitudinal chamber 7. This force is taken up by the bearings at the end of the hollow roll 3, which are thereby heavily stressed. In this situation, non-uniform line pressure is also obtained.

In order to prevent this, a pressure ratio monitoring device 60 is built into the pressure control device.

In principle, it would be possible, in order to obtain the heretofore described function of controlling pressure in the floating roll 1 in dependence on the pressure in the loading device 10, to let the line 38 open directly into the adjusting valves 40 and 41 and the line 20 directly into the line 19. According to FIG. 1, however, these lines are brought through the pressure ratio monitoring device 60, and in addition, the pressures in the longitudinal chambers 7 and 8 are tapped via lines 61 and 63 and fed to a pneumatic-hydraulic control element 62, which is part of the pressure ratio monitoring device 60.

The control pressure 50 in the line 20 is present at the input 64 of the control element 62, and the pressure in the lines 61 and 63, at the inputs 65 and 66. The control signal 51 present in the line 38 arrives at the input 67 and is passed at the output 68 into the line 39. The output 68 is furthermore connected to the input 69.

In the control element 62, the control pressure 50, which represents the pressure in the loading device 10, is now compared with the actual pressure prevailing in the floating roll 1. If the ratio between these two pressures is not more than a predetermined value, then the control element 62 remains inactive and lets the control signal 51 present in the line 38 pass through without change from the input 67 to the output 68 and from there, via the line 39 to the adjusting valves 40 and 41.

If, however, the pressure in the floating roll 1 cannot reach the value called for by the control pressure 50 and the pressure is therefore larger than the predetermined value, then only a certain portion of the control signal 51 is passed to the adjusting valves 40 and 41, which then also let only pneumatic pressure accordingly reduced from the set value through via the lines 42 and 43 to the converters 44 and 45, whereby the hydraulic pressure in the lines 21 and 22 and therefore, in the loading device 10, is lowered, so that the correct pressure ratio readjusts itself.

In FIG. 1, the control element 62 is only shown schematically; a practical embodiment will now be described in conjunction with FIGS. 2 and 3.

It can now happen that due to some defect, the mechanism generating the pneumatic control pressure 50 fails. In such an event, the pressure ratio monitoring device 60 would not respond, since the pneumatic control pressure cannot be too high relative to the pressure in the floating roll. Nevertheless, the ratio of the pressure of the loading device 10 and the floating roll 1 can be considerably disturbed.

To provide protection in such a case, the pneumatic systems for the control pressure 50 and the control signal 51 are coupled via the line 73. At the output 30 of the converter 29, a pressure representative of the pressure on the closed sides of the piston/cylinder units 9 is taken off and fed to the inputs 71 and 72 of a pneumatic control element 70, which passes on from the input 74 to the output 75 the pressure present in the line 37 only in accordance with the pressure increase in the line 73. Thus, only if the pneumatic system reports a pressure increase in the piston/cylinder units 9 can an accordingly increased portion of the pressure in the line 37 pass into the line 38 as a control signal. Thus, it cannot happen that the pressure in the loading device 10 will be increased, while the control pressure 50 for the floating roll fails to appear and the pressure ratio monitoring device 60 is inactive, the purpose of which is to exactly ascertain that the pressure in the loading device 10 does not become too high.

Further protection is provided by a pressure limiter 80 in the line 20. The pressure limiter 80 prevents, for instance, due to a failure of the relief pressure on the piston rod sides of the piston/cylinder units 9, a very peaked control pressure 50 from suddenly getting to the difference pressure control 16 and raising the pressure in the floating roll 1 beyond the permissable value.

Figure 2:
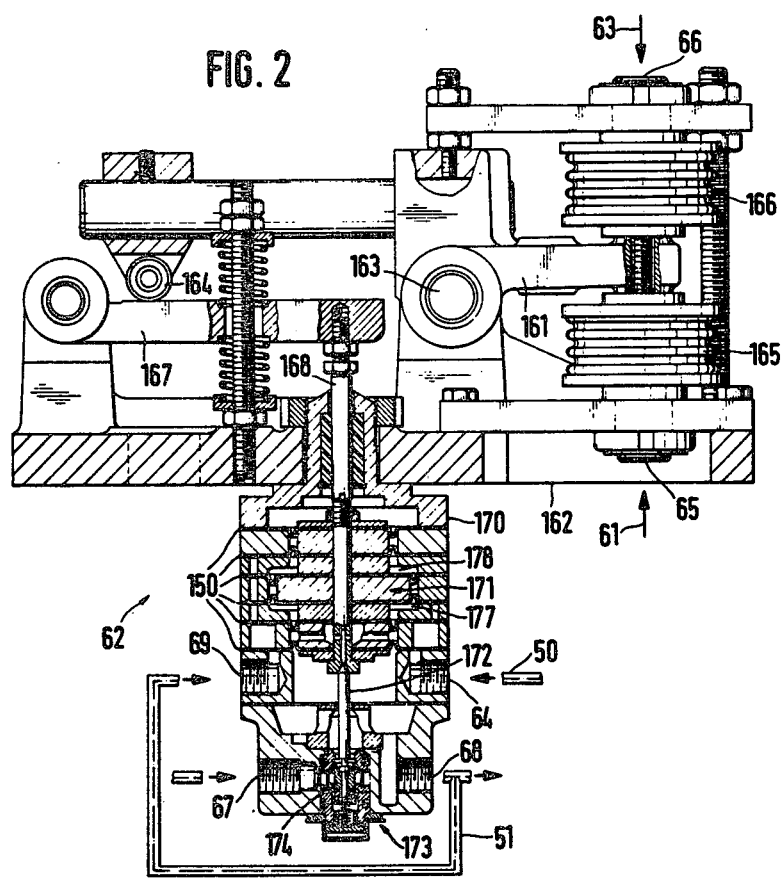
FIG. 2 is a cross section through the pressure ratio monitoring device according to the present invention.
Figure 3:
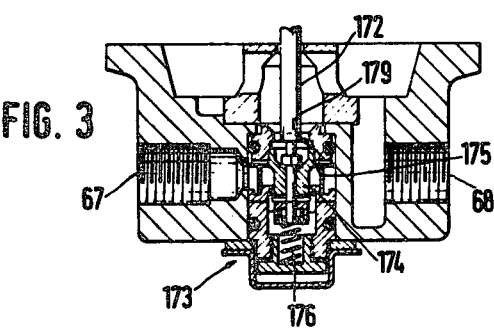
FIG. 3 is an enlarged partial view of the lower end of the device according to FIG. 2.

In FIGS. 2 and 3, the pneumatic/hydraulic control element 62 is shown in detail. On a base plate 162, two bellows 165 and 166 are arranged on the same axis; they are firmly supported on their sides facing away from each other and into which lead the lines 65 and 66, respectively, which carry the pressure in the two chambers 7 and 8 of the floating roll 1. With their sides facing each other, the bellows engage a two arm lever 161 which is fulcrumed at 163 and transmits its movement via a roller 164 to a one arm lever 167 which in turn acts on a pin 168 which is subjected to an upward or downward force, according to FIG. 2, if the ratio of the pressure in the bellows 165 and 166 changes.

The pin 168 rests on a diaphragm body 171 mounted in a housing 170, which is connected to the base plate 162. The diaphragm body 171 is held at the housing 170 by several diaphragms 150 which are lined up in the direction of the axis of the pin 168 and can move in the axial direcction. The displacement is transmitted via a pin 172 to the closing body 174 of a throttling valve 173. The upper edge of the closing body 174 cooperates with a conical sealing surface 175 of the throttling valve 173 to form a control edge 178. If the pin 172 and therefore, the closing body 174 move downward, then the upper edge of the closing body moves away from the seating surface 175, and a passage from left to right as per FIGS. 2 and 3 is opened up. Normally, the closing body 174 is held in contact with the sealing surface 175 by the spring 176.

The inputs corresponding to the presentation in FIG. 1 are drawn in FIGS. 2 and 3. Accordingly, the control pressure 50 is present at the input 64; it also prevails in chamber 177. In the chamber 178 of the same size, the signal pressure 51 of the output 68 is present, which is also conducted via the input 69 to the chamber 178, so that the diaphragm body 171 is partially pressure-relieved by the pressures prevailing in the chambers 177 and 78.

If now the pressure in the longitudinal chamber 7 facing the roll gap in the floating roll 1 drops during operation, this pressure drop propagates via input 65 in the bellows 165, which accordingly will collapse somewhat. The right hand side of the two arm lever 161 as shown on FIG. 2 will move downward and the roller 164 upward. Correspondingly, the one arm lever 167, the pin 168, the diaphragm body 171, the pin 172 and the closing body 174 also move upward. In cooperation with the sealing surface 175, the control edge 179 is closed and the air steam flowing from the input 67 to the output 68 is throttled. Thereupon, the pressure in the loading device 10 and the control pressure 50, representing the former, are lowered. This means that the pressure in the chamber 177 drops and the diaphragm body 171 moves downward according to FIG. 2. This creates a larger opening at the control edge 179, so that the control signal can pass again from 67 to 68 less attenuated, or with no change at all. Then, equilibrium occurs matching the conditions.

Figure 4:
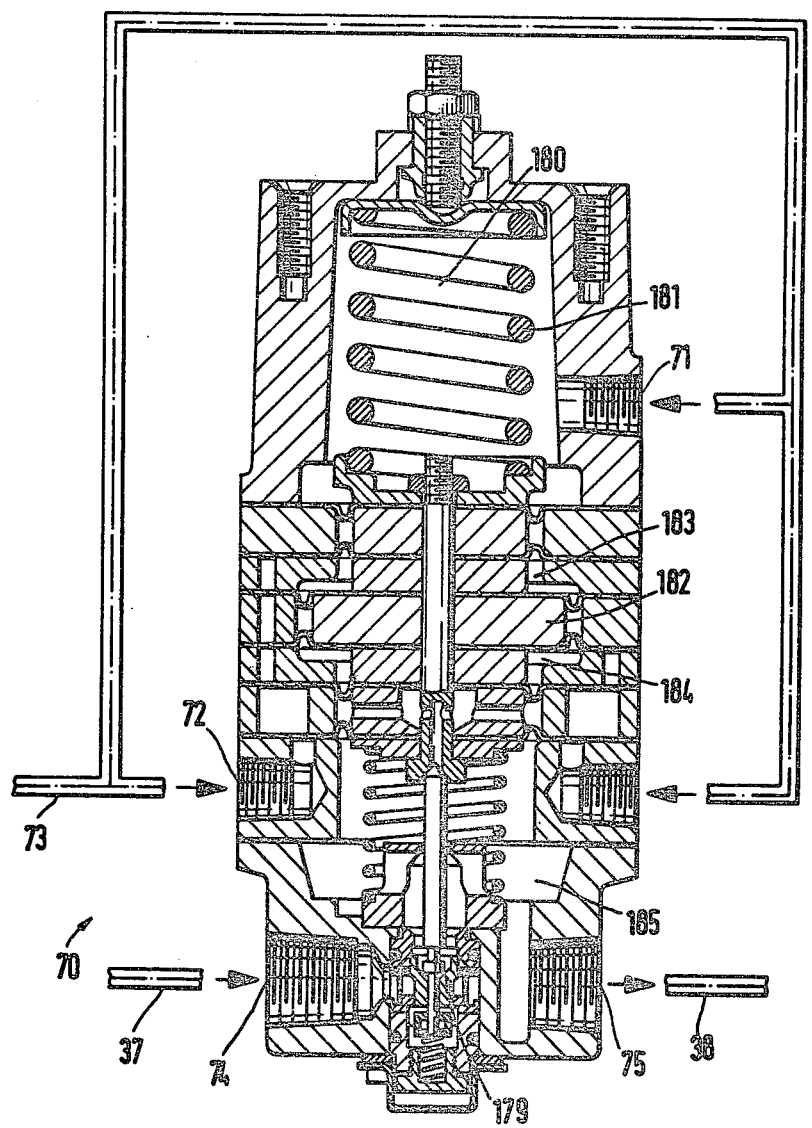
FIG. 4 is a cross section through a pneumatic control element contained in the pressure control device.

In FIG. 4, the control element 70 is shown, the design of which corresponds in substance to the lower part of the control element 62 in FIG. 2. Instead of the pin 169, merely a chamber 180 is provided. Chamber 180 contains a spring 181 and, within chamber 180, the pressure of the line 73, present at the input 71, prevails, which represents the pressure in the loading device 10. The same pressure also prevails in the chambers 183 and 184, so that the diaphragm body 182 is pressure relieved.

If now, for instance, due to a disturbance, the air supply, the output signal of the device 29 and therefore, the pressure line 73 or the chamber 180 drop off, then the diaphragm body 182 moves upward, and the control edge 179 closes. The passage from the input 74 to the output 75 is reduced down to a small predetermined base pressure for the loading device 10. Thus, an increased loading pressure can occur in no case.

I claim:

1. A pressure control device for processing machines having at least one roll which has a stationary core, around which a hollow roll which forms the roll proper revolves with radial spacing from the core, the hollow roll supported at its ends on the core and supported on the core in the radial direction by a fluid pressure medium which is disposed in a chamber formed at the core, the fluid pressure medium generating a force acting on the inside of the hollow roll and thereby generating the operating pressure of the roll; a counter roll supported in opposition to said roll with a stationary core, one of said rolls being supported in a stationary manner; a loading device which is operated by a fluid pressure medium supporting the other of said rolls so as to apply a pressure thereto, said roll with a stationary core around which a hollow roll is disposed and having a chamber for a fluid pressure medium and said loading device, respectively, forming first and second pressure controllable devices, comprising:

(a) means to supply a predetermined pressure to one of said pressure controllable devices said device thereby becoming a controlling element;

(b) means to derive from the pressure prevailing in said controlling element, a control pressure;

(c) means having said control pressure as a control input for adjusting a pressure in the other of said pressure controllable devices, which is in a definite predetermined pressure ratio to the pressure in the controlling element, said other pressure controllable device thereby becoming a controlled element;

(d) means for measuring the actual pressure in the controlled element; and (e) a pressure ratio monitoring device having as inputs said control pressure and said actual pressure, said monitoring device adapted to reduce the pressure applied to said controlling element if the pressure in said controlling element is too high relative to said predetermined pressure ratio.

2. A pressure control device according to claim 1, wherein a separate pneumatic system which generates a control signal for adjusting the pressure in the controlling element is provided for controlling the pressure ratio, and wherein said pressure monitoring device comprises a control element coupled to be acted upon by pressures representative of the pressures in the roll and in the loading device, respectively, and said monitoring device adapted to pass the control signal unchanged as long as the ratio of the controlling pressure to the controlled pressure reaches, at most, the predetermined value and to throttle down the control signal as soon as the ratio exceeds said value.

3. A pressure control device according to claim 2, wherein the pneumatic system also generates a pneumatic control signal for the controlled element, which is derived from the controlling element, said control signal being coupled over a corresponding line to the controlled element, and wherein said control element comprises a diaphragm arrangement coupled to actuate a throttling valve arranged in a line carrying the control signal, said diaphragm having one side coupled to the control pressure and means acting on its other side with a force formed from the actual pressure in the controlled element.

4. A pressure control device according to claim 3, wherein two oppositely disposed chambers are provided at the core of the roll, which chambers contain hydraulic fluid at different pressures and wherein the difference of these pressures determined the working pressure of the roll, and wherein said means acting comprise two coaxially opposed bellows facing each other having the pressure in the two chambers coupled thereto respectively and said bellows firmly supported on the sides facing away from each other, a lever coupled to the facing sides of said two bellows and mechanical transmission means for transmitting the displacement of said lever to said diaphragm arrangement.

5. A pressure control device according to claim 4, wherein the selectable setting of hydraulic working pressures takes place via pneumatically controlled regulators for the hydraulic pressure, which adjust a hydraulic pressure dependent on the pneumatic control signal, the feed line carrying a pneumatic control signal containing an adjusting valve which generates a pneumatic control signal which is an adjustable portion of a fixed pneumatic pump pressure, and wherein said pressure ratio monitoring device is arranged in the line carrying the fixed pneumatic pump pressure to said adjusting valve.

6. A pressure control device according to claim 5, wherein a pneumatic control element having as inputs a pneumatic pressure representing the pressure in the controlling element and the fixed pneumatic pump pressure, which element couples a correspondingly increasing portion of the fixed pneumatic pressure to its output as the first-mentioned pressure increase, is arranged in the line carrying a fixed pneumatic pump pressure to the adjusting valves, ahead of the pressure ratio monitoring device.

7. A pressure control device according to claim 6, and further including a pressure limiter arranged in the line of the control pressure for the controlled element.

8. A pressure control device according to claim 1, and further including a pressure limiter arranged in the line of the control pressure for the controlled elements.

* * * * *